United States Patent [19]
Lee

[11] Patent Number: 5,808,829
[45] Date of Patent: Sep. 15, 1998

[54] LOADING DEVICE FOR DRAINING STATIC ELECTRICITY OF A CASSETTE OF A VCR

[75] Inventor: Hyun-Moo Lee, Seoul, Rep. of Korea

[73] Assignee: Daewoo Electronics Co., Ltd., Seoul, Rep. of Korea

[21] Appl. No.: 845,428

[22] Filed: Apr. 25, 1997

[30] Foreign Application Priority Data

Apr. 25, 1996 [KR] Rep. of Korea .................. 96-12777

[51] Int. Cl.$^6$ .................. G11B 15/675; G11B 15/665
[52] U.S. Cl. .................. 360/96.5; 360/85
[58] Field of Search .................. 360/84, 85, 96.5, 360/96.6

[56] References Cited

U.S. PATENT DOCUMENTS

| | | | |
|---|---|---|---|
| 4,535,367 | 8/1985 | Kanda | 360/10.2 |
| 4,847,711 | 7/1989 | Inoue | 360/96.5 |
| 5,229,897 | 7/1993 | Kimula | 360/96.5 |
| 5,239,427 | 8/1993 | Ooka et al. | 360/96.5 |

*Primary Examiner*—Robert S. Tupper
*Attorney, Agent, or Firm*—Cushman Darby & Cushman Intellectual Property Group of Pillsbury Madison & Sutro, LLP

[57] ABSTRACT

Disclosed is a loading device of a video cassette recorder for draining static electricity of a cassette, which includes a cassette holder for moving a cassette into the video cassette recorder and a static electricity draining member for draining the static electricity of the cassette when the cassette holder moves. The static electricity of the cassette is primarily removed by a first static electricity draining member when the cassette is moved into the video cassette recorder, and is secondarily removed by a second static electricity draining member when the cassette is lowered to a base. Because of perfect elimination of the static electricity of the cassette to be loaded, there are advantages that a perfect loading of the cassette is performed and a screen quality is improved.

4 Claims, 3 Drawing Sheets

LOADING DEVICE FOR DRAINING STATIC ELECTRICITY OF A CASSETTE OF A VCR

BACKGROUND OF THE INVENTION

1. Field of the Invention

The present invention relates to a video cassette recorder, and more particularly to a loading device for removing static electricity of a cassette which is loaded into the video cassette recorder.

2. Description of the Prior Art

Generally, a video cassette recorder is an apparatus for recording/reproducing to/from a magnetic tape which winds around a supply reel and a take-up reel and is enclosed inside a cassette. The video cassette recorder (hereinafter VCR) comprises a base (or main chassis or deck) and a running system mounted on the base for withdrawing the magnetic tape from the cassette and running the tape along a predetermined path.

The running system includes a head drum assembly for recording/reproducing a video signal to/from the magnetic tape drawn from the cassette, wherein the head drum assembly rotates while making contact with the tape, an audio head for reproducing an audio signal from the tape, a capstan shaft driven by a capstan motor for running the tape in cooperation with a pinch roller, and a reel driving part disposed between the supply reel and the take-up reel for alternatively driving the supply reel or the take-up reel by power from the capstan motor after the cassette is loaded.

Moreover, the conventional VCR includes a tape loading device for loading the cassette on the running system. As shown in FIG. 1, the loading device 10 includes a cassette holder driven by a loading motor (not shown) 16 for guiding the cassette 12, a guide spring 18 for guiding the cassette 12 which is being loaded, wherein an end of the guide spring 18 is fixed at the interior of the cassette holder 16, an opening member 22 for opening a cover 14 of the cassette 12 when the cassette 12 is lowered to the base, and a loading post 24 for bringing the tape into contacting with the head drum assembly (not shown) by drawing the tape from the opened cassette 12.

When the cassette 12 is inserted into the cassette holder 16, the cassette holder 16 is loaded by the loading motor. At this time, the cassette 12 is moved to the head drum assembly without vibration by the guide spring 18. The cassette 12 is lowered a predetermined distance and is opened by the opening member 22 for pivoting and opening the cover. At this time, the loading post 24 draws the tape 13 from the cassette 12 and makes the tape 13 contact with the head drum assembly. At this time, a loading process of the cassette 12 is finished. The running system runs the tape 13 in accordance with a mode such a fast forward mode, a reproducing mode, and a rewinding mode.

However, because most of the cassette 12 is made of a synthetic resin, a static electricity easily occurs on a surface of the cassette 12 when the surface rubs against other materials. The static electricity is transmitted to the tape 13 through the cassette 12, causes dust to attach to the surfaces of the cassette 12 and the tape 13. The electricity of the cassette 12 and the tape 13 also causes attachment of the tape 13 to the cassette 12.

If the tape 13 is attached to the cassette 12, the tape 13 pivots together with the cover 14 even though the cover has been opened by the opening member 22. Thus, as shown in FIG. 2, the tape 13 is not drawn from the cassette 12 by the loading post 24. In addition the dust causes the VCR to become inactive and diminishes the screen quality of the reproducing mode.

U.S. Pat. No. 4,535,367 issued to Seizo Watanabe on Oct. 26, 1982 with the title of "Magnetic Head", discloses a shielding case for removing the static electricity of the magnetic tape. Watanabe attempts to improve the screen quality by removing the static electricity by the shielding case. However, the magnetic head of Watanabe can not remove the static electricity of the cassette and cannot prevent mis-loading of the cassette due to the static electricity.

SUMMARY OF THE INVENTION

Accordingly, it is an object of the present invention to provide a loading device of a VCR for performing a precise loading of a cassette and for improving screen quality of a reproducing mode by removing static electricity of the cassette.

To accomplish the object, there is provided in the present invention a loading device of a VCR comprising:

a cassette holder, into which a cassette including a magnetic tape is inserted, the cassette holder being moved to the interior of a VCR by a loading motor installed on a base;

a guide spring fixed at an upper portion of the cassette holder for guiding the cassette when the cassette holder being moved;

a first static electricity draining member which is fixed at one end to a lower surface of a top plate, for draining static electricity of the cassette to a top plate of a case by making contact with a cover of the cassette; and an opening member for opening the cover of the cassette when the cassette is lowered;

wherein after the opening of the cassette, the magnetic tape is drawn by a loading post and is brought into contact with a head drum assembly for recording/reproducing a video signal to/from the magnetic tape.

According to the present invention, the loading device of a VCR further comprises a second static electricity draining member for draining the static electricity to the base when the cover is open, the second static electricity draining member being mounted to the opening member.

According to the present invention, the first and second static electricity draining members are made of an electrical conductor. The first static electricity draining member is a spring having an elastic coefficient and the second static electricity draining member is installed so that it wraps around both surfaces and an upper end of the opening member.

According to the present invention, the static electricity of the cassette which is loaded into a VCR is effectively removed so that inactivities of the VCR are prevented and a screen quality is improved.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, the constituting elements and the operation principles of a loading device according to a preferred embodiment of the present invention will be explained in more detail with reference to the accompanying drawings.

Figure 1:
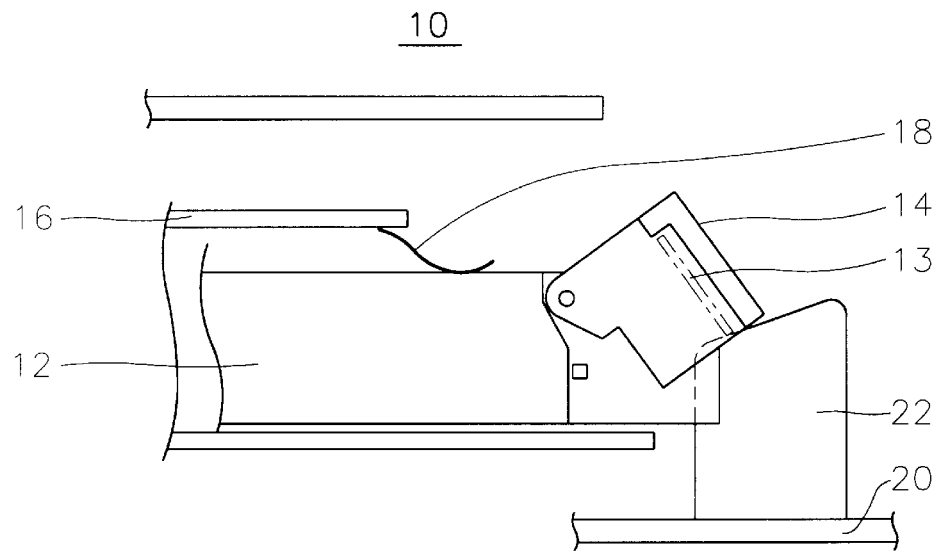
FIG. 1 is an illustrative view of a loading or a cassette according to a conventional loading device of a VCR.
Figure 2:
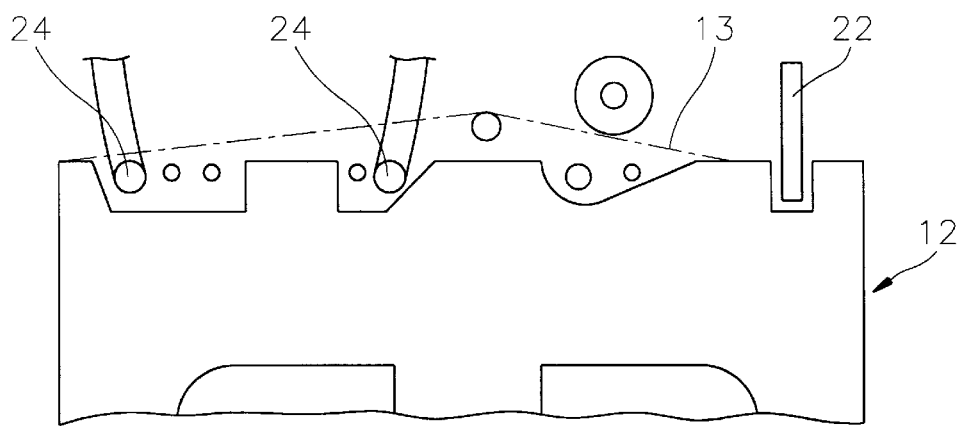
FIG. 2 is a plan view for illustrating an inactivity of tape of the cassette due static electricity in FIG. 1.
Figure 3:
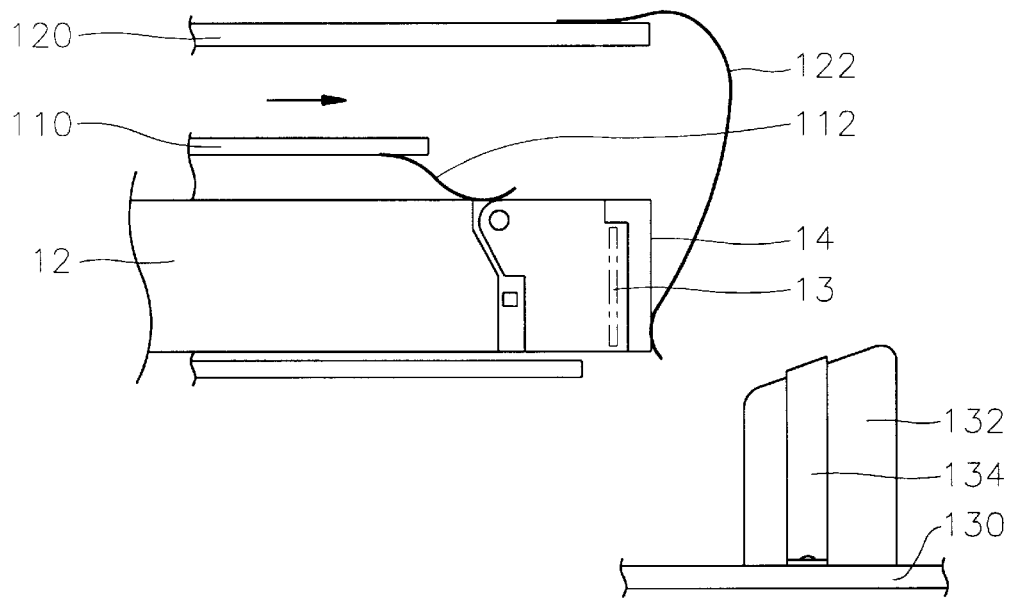
FIG. 3 is a drawing for showing movement of the cassette toward the VCR according to a loading device of the present invention.
Figure 4:
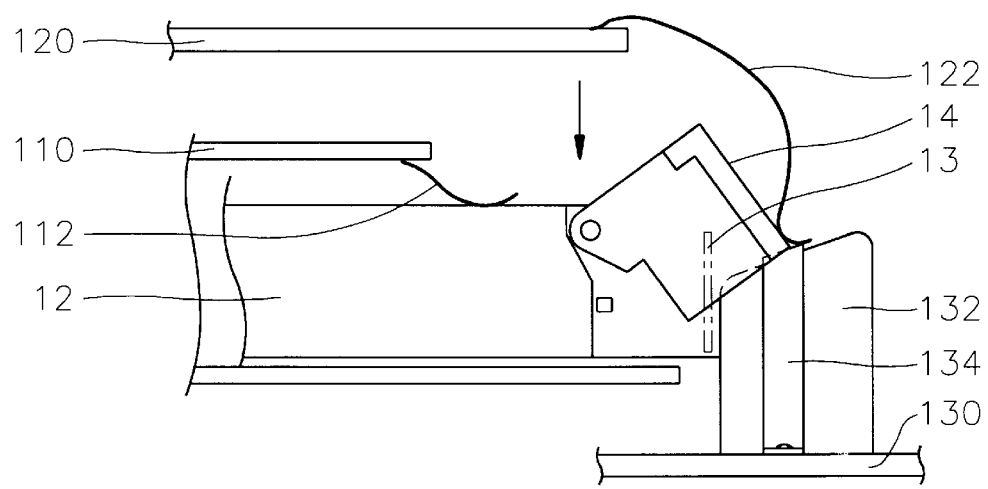
FIG. 4 is a drawing for showing a lowering of the cassette in FIG. 3.
Figure 5:
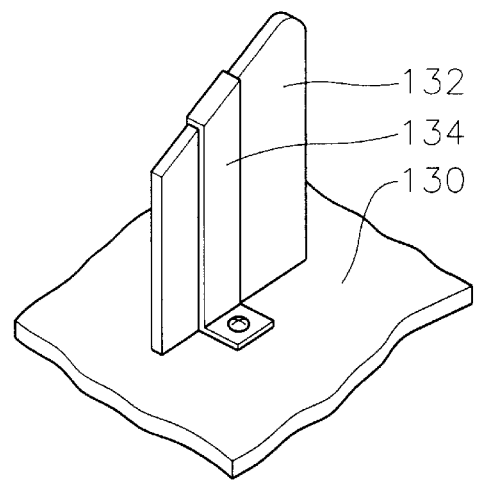
FIG. 5 is a drawing for showing an opening member and a second static electricity draining member shown in FIGS. 3 and 4.
Figure 6:
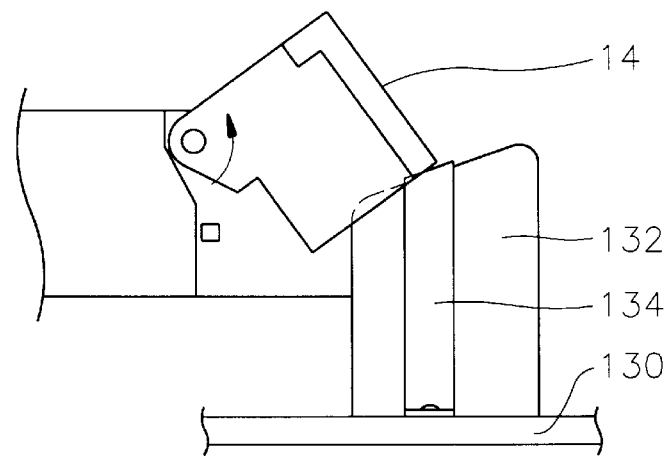
FIG. 6 is a drawing for showing a state in which the cover of the cassette has been opened by the opening member.

FIGS. 3 and 4 show a loading device 100 according to a preferred embodiment of the present invention. As shown in FIGS. 3 and 4, loading device 100 according to the preferred embodiment of the present invention comprises a cassette holder 110 for receiving a cassette 12 and which is moved into a VCR by a loading motor (not shown), a guide spring 112 for guiding the cassette holder 110 when the cassette holder 110 is being moved into the VCR, a first static electricity draining member 122 which is fixed at one end to a lower surface of a top plate 120 and makes contact with a cover 14 of the cassette 12 when the cassette 12 is moved into the VCR, and an opening member 132 for opening the cover 14 when the cassette 12 is lowered.

In the state of insertion of the cassette 12 into the cassette holder 110, the cassette holder 120 moves the cassette 12 into/out of the VCR. The guide spring 112 is fixed at a lower surface of an upper portion of the cassette holder 110 and presses against the cassette 12. Therefore, the cassette holder 110 stably moves into the VCR together with the cassette holder 110 due to the pressure of the guide spring 112.

After the cassette holder 110 moves a redetermined distance, the cove 14 of the cassette 12 makes contact with the first static electricity draining member 122. The first static electricity draining member 122 is a spring having a large elastic coefficient, and is connected at one end thereof to the lower surface of the top plate 120. The top plate 120 and the first static electricity draining member 122 are made of an electrically conductive material and drains the static electricity which occurs on the cassette 12.

The cassette 12 is lowered in order to be loaded. As the cassette 12 is lowered, the cover 14 is pivoted and opened by the opening member 132 installed on the base 130 of the VCR. The opening member 132, as shown in FIG. 4, has an inclined upper end.

A second static electricity draining member 134 is attached to the opening member 132. The static electricity draining member 134 wraps around two sides and the upper end of the opening member 132, and is fixed to the base 130. The second static electricity draining member 134 is made of an electrically conductive material. The second static electricity draining member 134 makes contact with the cover 14 when the cover 14 is opened by the opening member 132, and drains the static electricity of the cover 14 in cooperation with the first static electricity draining member 122. In other words, the static electricity of the cover 14 of the cassette 12 is drained to the top plate 120 via the first static electricity draining member 122 and to the base 130 via the second static electricity draining member 134.

If the cassette 12 is opened by the opening member 132, the tape 13 drawn from the cassette is brought into contact with the head drum assembly by the loading post. Thereafter, the tape 13 is run by the running system and the head drum assembly records/reproduces the video signals to/from the tape 13.

The operation of the above-described the loading device 100 of the VCR according to the preferred embodiment of the present invention will be described below.

First, the cassette 12 is inserted into the cassette holder 110. The cassette holder 110 receiving the cassette 12 is moved into the VCR by the loading motor, and the first static electricity draining member 122 makes contact with the cover 14 of the cassette 12. At this time, the static electricity of the cover 14 is drained to the top plate 120 by the first static electricity draining member.

If the cassette holder 110 moves further into the VCR, the cassette 12 is lowered toward the base 130. As the cassette holder 110 is lowered, the cover 14 is opened by the opening member 132. At this time, the second static electricity draining member 134 makes contact with the cover 14, and the static electricity of the cover 14 is drained to the base 130 through the second static electricity draining member 134. Thus, the static electricity of the cover 14 is firstly drained to the top plate 120 through the first static electricity draining member 122 and secondarily drained to the base 130 through the second static electricity draining member 134.

As described above, the loading device of the video cassette recorder according to the present invention has a simplified structure and effectively removes the static electricity of the cassette being loaded so that inactivities of the video cassette recorder due to the static electricity are prevent.

It is also not neccessary to remove again the static electricity of the cassette by the head drum assembly and the running system because the static electricity of the cassette has been removed by the loading device, thereby improving the screen quality of the VCR.

According to the present invention, the static electricity of the cassette which is loaded into a VCR is effectively removed so that inactivities of the VCR are prevented and a screen quality is improved.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. A loading device of a video cassette recorder comprising:

a cassette holder, into which a cassette including a magnetic tape is inserted, said cassette holder being moved to an interior of the video cassette recorder by a loading motor installed on a base;

a guide spring fixed at an upper portion of said cassette holder for guiding the cassette when said cassette holder is being moved;

a first static electricity draining member for draining a first static electricity electrified on an outer surface of the cassette through a top plate of a case by making contact with an outer surface of a cover of the cassette, said first static electricity draining member being fixed at one end thereof to an end portion of an upper surface of the top plate;

an opening member for opening the cover of the cassette when the cassette is lowered; and a second static electricity draining member for draining a second static electricity electrified on an inner surface of the cassette through the base by making a surface contact with an inner surface of the cover of the cassette when the cover is opened by the opening member;

wherein after opening the cover of the cassette, the magnetic tape is drawn by a loading post and is brought into contact with a head drum assembly for recording/reproducing a video signal to/from the magnetic tape.

2. A loading device of a video cassette recorder as claimed in claim 1, wherein said first static electricity draining member is made of an electrically conductive material and includes a spring having a predetermined elastic coefficient.

3. A loading device of a video cassette recorder as claimed in claim 2, wherein said second static electricity draining member is made of an electrically conductive material, has a predetermined width and wraps around both sides and an upper portion of said opening member.

4. A loading device of a video cassette recorder comprising:

a cassette holder, into which a cassette including a magnetic tape is inserted, installed on a base for moving the cassette to an interior of the video cassette recorder, said cassette holder being driven by a loading motor installed on the base;

a guide spring fixed at an upper portion of said cassette holder for guiding the cassette when said cassette holder being moved;

a first static electricity draining member for draining a first static electricity electrified on an outer surface of the cassette through a top plate of a case by making contact with an outer surface of a cover of the cassette, said first static electricity draining member being fixed at one end thereof to an upper surface of the top plate and including a spring made of an electrically conductive material having a predetermined elastic coefficient;

an opening member for opening the cover of the cassette when the cassette is lowered; and a second static electricity draining member for draining a second static electricity electrified on an inner surface of the cassette through the base by making a surface contact with an inner surface of the cover of the cassette when the cover is opened by said opening member, said second static electricity draining member being made of an electrically conductive material, wrapping around both sides and an upper portion of said opening member;

wherein after opening the cover of the cassette, the magnetic tape is drawn by a loading post and is brought into contact with a head drum assembly for recording/reproducing a video signal to/from the magnetic tape.

* * * * *